3,403,743
MULTIPLE WHEEL DRIVE AND STEERING VEHICLE
Robert C. Daymon, 7450 Weller Road,
Gregory, Mich. 48137
Filed Nov. 21, 1966, Ser. No. 595,989
1 Claim. (Cl. 180—24)

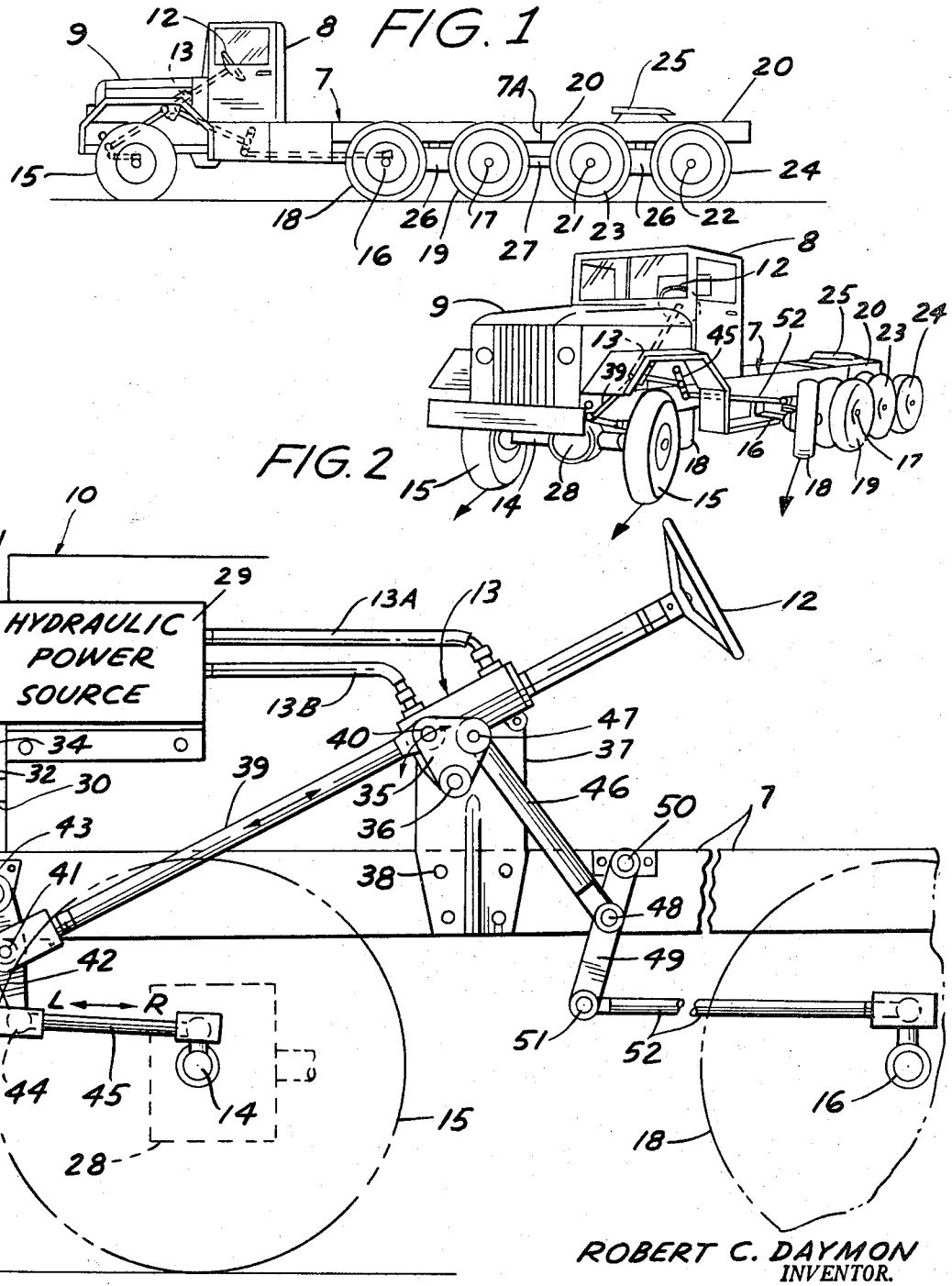

ABSTRACT OF THE DISCLOSURE

This application discloses a fifth wheel tractor having two single wheeled steer and drive axles and three tandem wheeled, drive axles, and power means to actuate the turning of the steer axles in a five to three ratio. The invention resides in the particular combination and arrangement of the elements, which provides a greater load carrying capacity and a wider distribution of load, when a trailer is added and facilitates the forward motion, steering and backing up of the tractor and trailer.

---

This invention relates to heavy automotive vehicles and has particular reference to a multiple drive wheel truck or tractor.

Under the weights and measures statutes the maximum gross load permitted on a tandem axle is 32,000 pounds and on a single axle the maximum gross load permissible is 16,000 pounds. This presents an economic problem to the trucking industry, inasmuch as the greater the load the less the cost per pound for transportation. The modern diesel truck or tractor is capable of hauling a much greater load than the law will permit, so that those in the industry have made many attempts to reconcile the factors.

Some persons have proposed that the tandem axles be spread farther apart, and others have suggested that there be installed on the vehicle additional, single load carrying axles, in order to distribute the weight of the load over a greater area and by so doing reduce the load on each axle. Either solution only introduces new problems, the problems of steering and backing up the vehicle being the most difficult.

It is therefore an object of this invention to solve the problems indicated above, and to provide a vehicle which will carry legally twice the maximum load, and a vehicle which will steer and back up with the same facility as does the conventional minimum load carrying vehicle.

Another object of the invention is to provide an extra load carrying vehicle, which may be constructed of parts and equipment which are readily available on the open market.

A further object of the invention is to provide a multiple drive wheel vehicle, which is provided with steering wheels in front of and in back of the control cab.

Another object of the invention is to provide a vehicle with two sets of power driven tandem axles, one axle of which is also a steering axle.

Another object of the invention is to provide a vehicle of the character indicated which is constructed with at least five load carrying, power driven axles, two of which are also power steering axles.

The foregoing and other objects and advantages of the invention will become more apparent as the description proceeds, reference being made from time to time to the accompanying drawing, forming part of the within disclosure, in which drawing:

FIG. 1 is a side elevational view of a device embodying the invention.

FIG. 2 is a front perspective view of the device shown in FIG. 1, and illustrates the relation of the steering wheels and certain of the driving wheels to the other driving wheels of the vehicle.

FIG. 3 is an enlarged diagrammatic view illustrating the power mechanism for steering the four front wheels.

In practicing my invention I prefer to start with a conventional truck, or tractor, having a frame 7, a cab 8, hood 9, engine 10, steering wheel 12, power steering unit 13, front drive axle 14, rubber tired steering wheels 15, and tandem axles 16 and 17, on which are mounted rubber tired wheels 18 and 19. The original front dual axle of the conventional tandem of the truck is replaced with the single drive and steer axle 16, at each end of which is mounted a single rubber tired, steerable wheel 18. The steering wheels 18, when directed forwardly, lie in vertical planes which extend between the dual wheels of the following tandems.

In practicing my invention the frame 7 is extended rearwardly by welding, or otherwise securing, as at 7A, to the original frame 7, a frame extension 20, under which is positioned additional tandem axles 21 and 22, each having attached thereto rubber tired dual wheels 23 and 24. The frame extension 20 has mounted thereon a conventional fifth wheel 25.

Both tandem axle assemblies 16, 17, 21 and 22 are connected through conventional differential gear boxes 26, drive shaft 27, and a conventional transmission (not shown) to the engine 10, and function as in conventional practice.

The front drive axle 14 (FIG. 2) is also provided with a conventional gear box 28, which is likewise connected in the power train and is driven by the engine 10.

The wheels 15 and 18 are steered as follows:

The power steering unit 13 is connected, through flexible hose 13A and 13B, to a hydraulic power source 29 (FIG. 3), which is actuated by the engine 10 through the shafts 30 and 31, the pulleys 32 and 33, and the V-belt 34.

The double acting piston (not shown) of the power steering unit 13 actuates a rocker arm 35, which is pivoted as at 36 to a bracket 37, which is bolted, or otherwise secured, as at 38, to the frame 7.

A steering arm 39 is pivoted, as at 40, at one end to the rocker arm 35, and is pivoted at the opposite end, as at 41, to an intermediate arm 42, which is pivoted, as at 43, to the frame 7, and is connected by a ball and socket joint 44 to the steering linkage 45 of the axle 14.

A second steering arm 46 is pivoted at one end, as at 47, to the rocker arm 35, and is pivoted at its other end, as at 48, to an intermediate arm 49, which in turn is pivoted as at 50, to the frame 7 and is connected at its other end, by a ball and socket joint 51, to the steering linkage 52 of the drive and steering axle 16.

In order to effect the proper steering of the vehicle through the wheels 15 and 18, a definite turning ratio of five to three had to be established between the front and rear steering wheels.

From the foregoing it will be seen that I have disclosed a vehicle which will carry a legal gross pay load of double the capacity of a conventional vehicle. It will also be seen that I have disclosed a vehicle of increased length and capacity, which will negotiate comparatively short turns, have maximum steerability and one which can be backed up with the ease and facility of a short coupled vehicle.

It is believed that the operation of the device is obvious from the foregoing description.

Having described my invention, what I claim and desire to secure by Letters Patent is:

1. In tractor vehicle of the character described, having a frame, with a control cab and a fifth wheel mounted thereon and including a power source and power train ahead of said cab, and at least two tandem drive axle assemblies behind said cab and connected in said power train the forward axle of the leading tandem assembly also being a steer axle, and power means to simultaneously actuate said steer axles at a ratio of five to three, said steer axles being actuated by said power means through a rocker arm pivoted to said frame, said rocker arm having pivoted thereto a pair of arms, each of which connects with a second pair of arms pivoted to said frame, one arm of said second pair being connected by a ball and socket joint to the steering rod of one of said steer axles, and the other arm of said second pair being connected to the steering rod of the other steer axle, said steer axles being provided with a single wheel at each end and each of the non-steering axles being provided with tandem wheels, the single wheel of each said steer axle normally being in a vertical plane extending between the following tandem wheels.

References Cited

UNITED STATES PATENTS

| | | | |
|---|---|---|---|
| 1,281,847 | 10/1918 | Sarasin et al. | 180—24 |
| 2,375,670 | 5/1945 | MacPherson | 180—24 |
| 2,479,427 | 8/1949 | Stover | 280—91 |

A. HARRY LEVY, *Primary Examiner.*